Patented Aug. 23, 1932

1,873,262

UNITED STATES PATENT OFFICE

HERMAN BATTERMAN, OF CHICAGO, ILLINOIS, ASSIGNOR OF ONE-HALF TO A. P. HUNT

PREPARING BENTONITE COMPOSITIONS

No Drawing.   Application filed July 23, 1930. Serial No. 470,221.

The present invention relates to the preparation of bentonite compositions, and more particularly to dry compositions containing a soluble electrolyte, such as salt, intimately commingled with bentonite.

It has been proposed to employ, for cleaning purposes, a suspension of bentonite in water containing a suitable electrolyte, such as salt.

For commercial purposes, it is desirable to prepare a dry or approximately dry composition containing the bentonite and soluble electrolyte which can be sold and shipped without added water, and which may be admixed with the necessary water for producing the suspension by the consumer. Owing to the tendency of the bentonite to cake and form clay-like, impenetrable masses and to difficulties in admixture, it has not been practical to secure such a composition by mere mechanical mixture of the bentonite and the electrolyte, such as salt, or by dissolving the salt in water and mixing the resulting solution with the bentonite in the ordinary manner. Particularly in the latter case, the bentonite tends to form clay-like lumps or balls of a plastic character and of large size, which are substantially impenetrable and which resist drying to a marked degree. Such lumps are found to retain their moisture content after weeks of air drying and after days of forced drying by air circulation.

I have found that these difficulties may be avoided, and an intimate mixture of bentonite and an electrolyte, such as salt, made by the following process, in which I take advantage of certain unique features of behavior of bentonite which I have discovered.

In carrying out my invention, I distribute the bentonite to be employed in making the mixture in a shallow layer, ordinarily 6 to 8 inches in depth, but which may vary from, say, one-half inch to one foot or eighteen inches. I prepare a solution of the electrolyte in water, forming a strong or even saturated solution thereof, so as to minimize the proportion of water and facilitate drying. Thus, in preparing a mixture containing four parts of salt per one hundred, I may dissolve the four parts of salt in twelve to twenty parts of water, and preferably about fifteen parts. More dilute solution may be employed, particularly when lower proportions of salt relative to bentonite are used, since it is desirable to use sufficient liquid to completely penetrate the mass. The solution of eletrolyte is then sprayed or sprinkled over the layer of bentonite to secure an approximately uniform distribution thereof, either by means of sprays which uniformly and simultaneously spray the entire exposed surface of the layer of bentonite or by means of a spray or sprinkler which is moved progressively over the exposed surface of the layer of bentonite to secure uniform distribution of the electrolyte solution. When so applied, the solution of the electrolyte is absorbed by the layer of bentonite, and the latter, instead of forming impenetrable, clay-like lumps or cracks and breaks up into granules or nodules, for the most part less than a half inch across, and all of which, including the larger nodules, are friable and easily broken into smaller nodules. The granular mass may then be readily dried, either by air drying or by any other suitable means, as by forcing air through the shallow layer of granular material, as formed, or by passing the granular material through a rotary dryer or in any other suitable apparatus. The dried material, which may then be powdered, can be packed and shipped for use as a detergent, for example, as described.

It is readily apparent that any other suitable neutral electrolyte, such as potassium chloride, sodium or calcium sulfate or the like may be employed in place of the salt hereinbefore referred to, the term salt being employed herein to designate common salt or commercial sodium chloride, and that the proportion of the salt employed may be widely varied.

I claim:

1. The method of preparing a mixture of bentonite and a soluble electrolyte which comprises distributing bentonite in a shallow layer and applying to the surface thereof a solution of the electrolyte, whereby the electrolyte is absorbed and the bentonite breaks up into granular and friable nodules, the proportion of the solution being such as to be completely absorbed by the bentonite without soaking the latter.

2. The method of preparing a mixture of bentonite and a soluble electrolyte which comprises spreading the bentonite in a shallow layer, dissolving the electrolyte in water to form a solution, spraying the solution approximately uniformly over the exposed surface of the layer of bentonite, whereby the solution is absorbed by the bentonite and the latter breaks up into a granular and friable nodular mass, and drying the resulting mass, the proportion of the solution being such as to be completely absorbed by the bentonite without soaking the latter.

3. The method of forming a bentonite-salt mixture, which comprises spreading the bentonite in a shallow layer, dissolving the salt in water, and distributing the resulting salt solution uniformly over the surface of the bentonite, whereby the salt solution is absorbed by the later, the proportion of the solution being such as to be completely absorbed by the bentonite without soaking the latter, and as a result the bentonite breaks up to form a mass of granules and friable nodules.

4. The method of forming a bentonite-salt mixture which comprises spreading a layer of bentonite to a thickness of six to eight inches, dissolving salt in water in the proportions of four parts of salt and fifteen parts of water to each one hundred parts of bentonite, spraying the resulting salt solution uniformly over the surface of the bentonite layer, whereby the salt solution is dissolved by the latter and the bentonite mass breaks up into granules and friable nodules, and drying the resulting mass.

In testimony whereof I have hereunto set my hand this 21st day of July, 1930.

HERMAN BATTERMAN.